Dec. 28, 1954
C. H. FOLEY
2,698,170
HAY CURING MACHINE
Filed Feb. 9, 1951
3 Sheets-Sheet 1
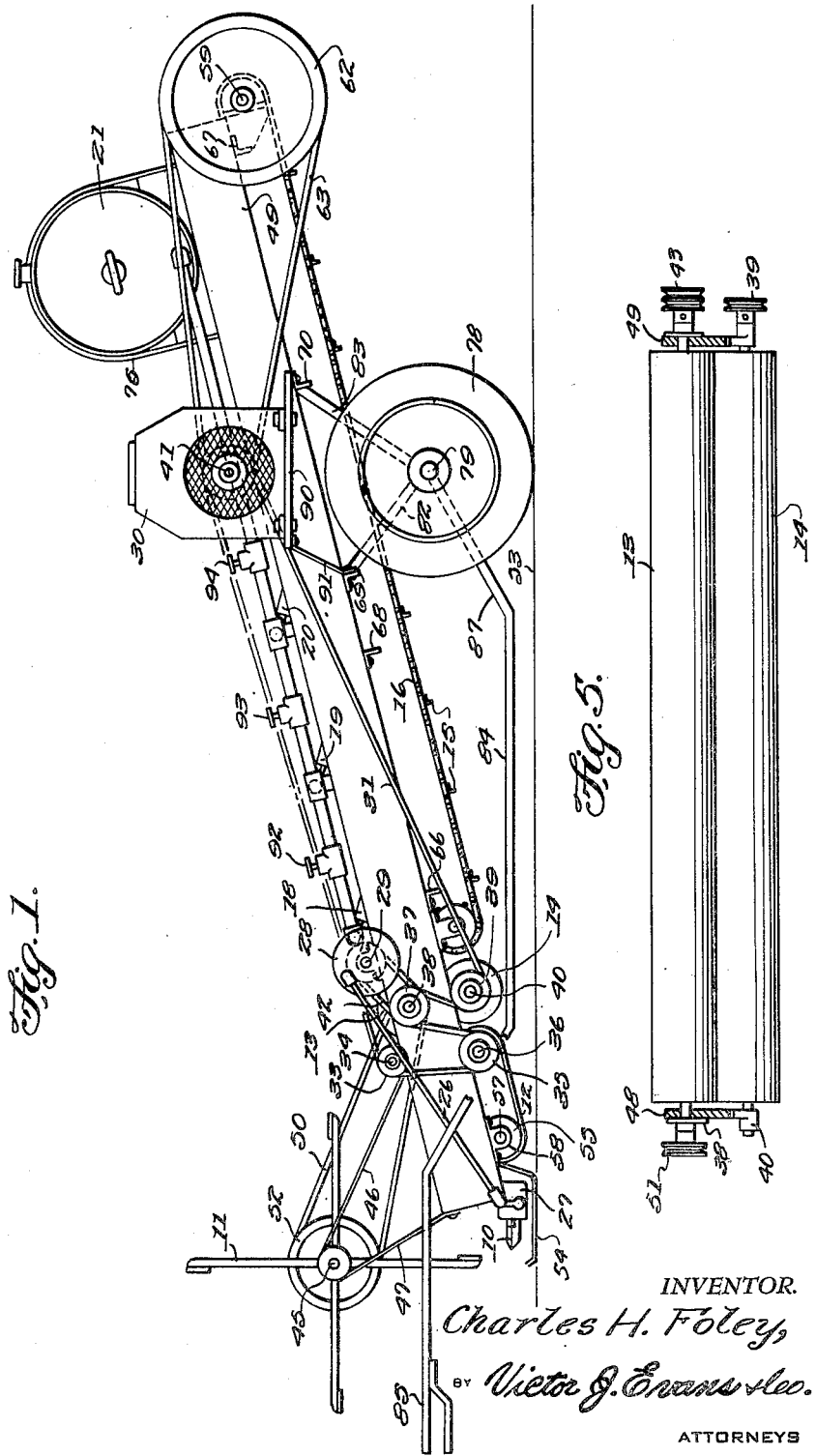
INVENTOR.
Charles H. Foley,
BY Victor J. Evans &co.
ATTORNEYS

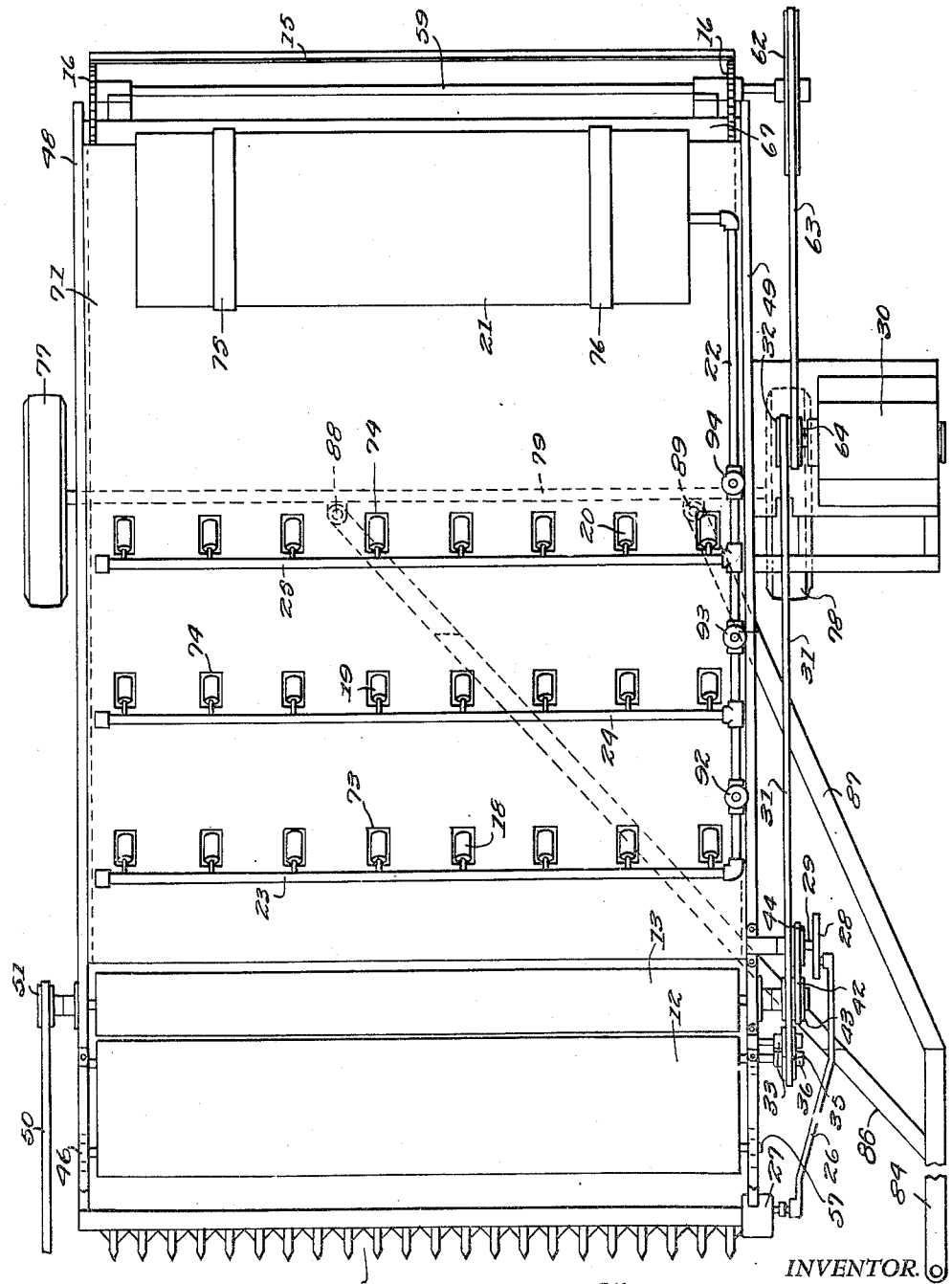

Dec. 28, 1954
C. H. FOLEY
2,698,170
HAY CURING MACHINE
Filed Feb. 9, 1951
3 Sheets-Sheet 3
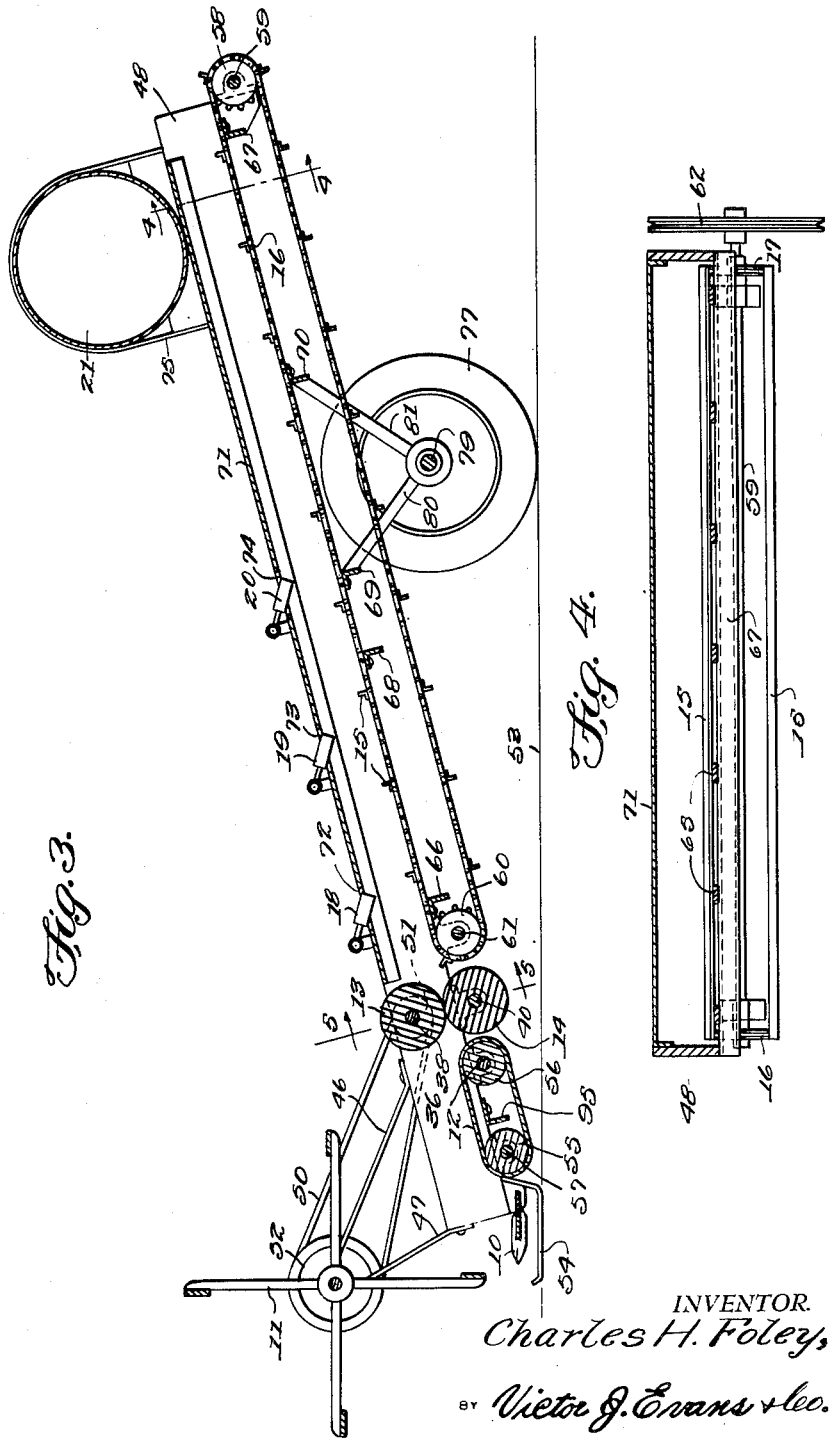
INVENTOR.
Charles H. Foley,
BY Victor J. Evans + Co.
ATTORNEYS

United States Patent Office 2,698,170
Patented Dec. 28, 1954

2,698,170

HAY CURING MACHINE

Charles H. Foley, Wichita Falls, Tex.

Application February 9, 1951, Serial No. 210,200

1 Claim. (Cl. 263—8)

This invention relates to farm equipment and particular machines for curing and drying hay and other forage products as the products are cut, and in particular this invention relates to a chain conveyor mounted on wheels having a cutter bar at the forward end with crushing rolls following the cutter bar and with burners at spaced points throughout the length of the conveyor for wilting and drying products as they are conveyed from the crushing rolls to the rear or discharge end of the machine.

The purpose of this invention is to provide means for expediting drying and curing of hay so that the hay may be baled within an hour after cutting in order to eliminate molding and other deterioration resulting from weather hazards and the like.

Various methods and processes have been used for heat treating and drying hay in the field and as it is baled, however in the usual method of harvesting where hay is baled in the field it is desired to thoroughly dry the hay immediately in order to prevent loss due to change in weather conditions, and the like. With this thought in mind this invention contemplates a drying attachment incorporated in a mowing machine whereby flame of burners positioned on the attachment passes through the green hay and heat from the burners thoroughly dries the hay wilted by the flame as the hay continues to pass through the attachment.

The object of this invention is, therefore, to increase the efficiency of a drying and curing machine so that the hay may be picked up immediately and baled.

Another object of the invention is to provide a hay drying and curing machine in which the drying elements are mounted in combination with a cutter bar.

A further object of the invention is to provide a machine for immediately drying and curing hay as the hay is cut, which is of a comparatively simple and economical construction.

With these and other objects and advantages in view the invention embodies an elongated frame mounted on wheels with a cutter bar carried by the forward end, with a reel extended above the cutter bar and positioned to move hay cut by the cutter bar toward a pair of crushing rolls and with a conveyor positioned to receive hay from the rolls and carry the hay through flame from spaced burners.

Other features and advantages of the invention will appear from the following description taken in connection with the drawings wherein:

Figure 1 is a side elevational view of the improved hay cutting and curing machine.

Figure 2 is a plan view of the machine.

Figure 3 is a longitudinal section through the machine with the parts in operative positions.

Figure 4 is a cross section taken on line 4—4 of Figure 3 showing the trailing or discharge end of the machine.

Figure 5 is a similar section taken on line 5—5 of Figure 3 showing the crushing rolls which receive hay from the cutter bar.

Referring now to the drawings wherein like reference characters denote corresponding parts the improved hay drying and curing machine of this invention includes a cutter bar 10, a reel 11, a feeder conveyor 12, crushing rolls 13 and 14, a conveyor having flights 15 carried by chains 16 and 17, and burners 18, 19 and 20 which are supplied with fuel from a supply tank 21 through a pipe 22 with headers 23, 24 and 25.

The cutter bar 10 is of the conventional type and, as illustrated in Figures 1 and 2 the cutters are actuated by a pitman 26 that extends from a reciprocating mechanism 27 to an eccentric 28 on a shaft 29 and the shaft is rotated by a motor 30 with a belt 31, which as illustrated in Figure 1 is trained over a pulley 32 on the motor, an idler pulley 33 on a shaft 34, a pulley 35 on a shaft 36 of the conveyor 12, a pulley 37 on a shaft 38 of the upper crushing roll 13, and a pulley 39 on the shaft 40 of the lower crushing roller 14, from which it extends to the pulley 32 on the shaft 41 of the motor. A belt 42, trained over pulleys 43 and 44 drives the shaft 29 from the shaft 38.

The reel 11, which is mounted on a shaft 45 that is journaled in brackets 46 and 47 which extend upwardly from side beams 48 and 49 of the conveyor frame, is driven by a belt 50 that is trained over a pulley 51 on the shaft 38, and a pulley 52 on the shaft 45.

Hay cut by the cutter bar 10, which is retained in spaced relation to the ground, as indicated by the numeral 53 by shoes 54, is carried rearwardly by the reel 11 and deposited upon the conveyor 12 which feeds it to the crushing rolls 13 and 14. The conveyor 12 is formed with an endless belt positioned over the rollers 55 and 56, the roller 56 being mounted on the shaft 36 and the roller 55 being mounted on a shaft 57 which is journaled in bearings 58 on the under surface of the side beams 48 and 49 of the conveyor.

The hay is delivered to the crushing rolls 13 and 14 by the conveyor 12 and the rolls squeeze off pulp, juices and the like from the hay whereby the resulting pressed material is delivered to the conveyor formed with flights 15 and chains 16 and 17.

The chains 16 and 17 are trained over sprockets 58 on a head shaft 59 at one end of the conveyor and over sprockets 60 on a tail shaft 61 in the opposite end of the conveyor. The conveyor is driven by a pulley 62 carried by the head shaft 59 and the pulley is driven by a belt 63 that extends from a pulley 64 on the motor shaft 41.

The flights 15 of the conveyor travel over spaced slats 65 which extend from a transversely disposed angle bar 66 at one end to a similar angle bar 67 at the opposite end. The slats are supported intermediate of the ends by cross angles 68, 69 and 70 and with the parts formed in this manner the spaces between the flights 15 and also between the slats 65 are open and flame and hot gases of combustion from the burners 18, 19 and 20 pass through hay carried upwardly on the slats 65 by the flights 15. The flame wilts the hay from which moisture has been pressed by the rollers 13 and 14 and after the hay leaves the burner 20 at which point it is substantially dry, it is thoroughly dried by heat in the upper end of the conveyor.

The conveyor housing which is channel-shape in cross section is provided with a cover plate 71 and the cover plate is provided with openings 72, 73 and 74 through which the burners extend, as illustrated in Figure 3.

The fuel supply tank 21 is mounted on the conveyor frame on plate 71 by brackets 75 and 76.

The conveyor frame is carried by wheels 77 and 78 which are mounted on an axle 79 and the axle is supported by struts 80 and 81 on one side and 82 and 83 at the other.

The device is also provided with a tongue 84 that is provided with a head 85 at the forward end and the tongue is provided with supporting struts 86 and 87 that are attached to the axle at the points 88 and 89. It will be understood that the tongue may be of any suitable type or design and may be attached to the frame by any means.

The motor 30 is supported on a platform 90, one end of which is mounted on the cross bar or angle 70 and the other on the angle 69 through a strut 91.

The supply pipe 22 from which the burner headers extend is provided with valves 92, 93 and 94 for controlling the supply of fuel to the burners.

With the parts assembled in this manner the hay drying and curing machine is drawn through the field by a tractor or the like and as hay is cut by the cutter bar 10 it is deposited upon the feed conveyor 12 by the paddles of the reel 11 and the conveyor 12 feeds the hay to the crusher rolls 13 and 14 which removes substantially all moisture from the hay and deposits the pressed products upon the slats and flights of the conveyor which carry the pressed hay below the burners whereby flames from the burners wilt and dry the hay.

The final dried product is discharged from the trailing end of the machine and deposited in windrows from which it is picked up and baled.

It will be understood that the side beams 48 and 49 of the conveyor frame may be formed of structural shapes or of any suitable material and, as illustrated in Figure 3 of the drawing these beams are connected at the upper ends by the angle 67 and at the lower ends by a similar angle, as indicated by the numeral 95. These beams with the connecting members are preferably formed of steel, however, it will be understood that suitable material may be used.

It will be understood that modifications may be made in the design and arrangement of the parts without departing from the spirit of the invention.

What is claimed is:

In a vegetation curing machine, the combination which comprises an inclined conveyor including a frame having endless chains positioned on the inside and at the sides thereof, flights spaced for carrying vegetation extended across and secured to said chains, a cover plate having openings therethrough carried by said side beams and spaced above the flights of the inclined conveyor, and spaced rows of burners mounted on the frame and positioned to extend through transversely disposed openings of the cover plate and also positioned to inject flames of burning fuel into vegetation on the flights of the conveyor with the flames passing through openings between stems and leaves of the vegetation.

References Cited in the file of this patent

UNITED STATES PATENTS

| Number | Name | Date |
|---|---|---|
| 1,053,162 | Denny | Feb. 18, 1913 |
| 2,218,466 | Gray et al. | Oct. 15, 1940 |
| 2,308,508 | Harrington | Jan. 19, 1943 |
| 2,350,096 | Chilton | May 30, 1944 |
| 2,397,363 | McLeod | May 26, 1946 |
| 2,465,070 | Demuth | Mar. 22, 1949 |
| 2,478,970 | Koon | Aug. 16, 1949 |
| 2,521,999 | Scott | Sept. 12, 1950 |